(12) United States Patent
Christensen et al.

(10) Patent No.: US 7,506,156 B2
(45) Date of Patent: Mar. 17, 2009

(54) METHOD AND APPARATUS FOR PRIORITIZING ENCRYPTED TRAFFIC AT AN INTERMEDIATE NODE IN A COMMUNICATIONS NETWORK

(75) Inventors: Lars-Törholm Christensen, Aallong (DK); Jari Tapio Vikberg, Järna (SE); Tomas Nylander, Stavsnäs (SE); Magnus Hallenstäl, Täby (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 663 days.

(21) Appl. No.: 11/047,881

(22) Filed: Feb. 1, 2005

(65) Prior Publication Data

US 2006/0172722 A1    Aug. 3, 2006

(51) Int. Cl.
*H04L 9/00*    (2006.01)
(52) U.S. Cl. .............. 713/153; 713/150; 713/151; 713/154; 709/226; 709/229; 726/11; 726/12; 726/13; 455/410
(58) Field of Classification Search ........... 713/153, 713/150, 151, 154; 709/226, 229; 726/11, 726/12, 13; 455/410
See application file for complete search history.

(56) References Cited

U.S. PATENT DOCUMENTS

| | | | |
|---|---|---|---|
| 6,304,578 B1 * | 10/2001 | Fluss | 370/413 |
| 6,741,556 B1 * | 5/2004 | Seddigh et al. | 370/229 |
| 6,801,530 B1 * | 10/2004 | Brandt et al. | 370/392 |
| 6,910,133 B1 * | 6/2005 | Cohn | 713/190 |
| 7,216,361 B1 * | 5/2007 | Roskind et al. | 726/9 |
| 7,367,045 B2 * | 4/2008 | Ofek et al. | 726/2 |
| 7,420,981 B2 * | 9/2008 | Zellner et al. | 370/412 |
| 2002/0042875 A1 * | 4/2002 | Shukla | 713/151 |
| 2002/0078341 A1 * | 6/2002 | Genty et al. | 713/151 |
| 2004/0037319 A1 * | 2/2004 | Pandya | 370/469 |
| 2004/0095935 A1 * | 5/2004 | Connor | 370/392 |
| 2004/0215955 A1 * | 10/2004 | Tamai et al. | 713/150 |

OTHER PUBLICATIONS

Shin J et al: "Content-Based Packet Video Forwarding Mechanism in Differenliated Service Networks" Integrated Media Systems Center and Department of Electrical Engineering Systems, XP002317790. May 1, 2000, p. 1, paragraph 1-p. 4, paragraph 3.1-p. 7, paragraph 4, figures 1,6, 7.

* cited by examiner

*Primary Examiner*—Kim Vu
*Assistant Examiner*—Beemnet W Dada (57) ABSTRACT

The present invention provides a method and apparatus for prioritizing encrypted traffic at an intermediate node within a communications network. The present invention provides a method and an intermediate node that prioritizes the processing of a packet based on one or more size-based criteria, the packet comprising one or more headers and an encrypted payload. The one or more size-based criteria are satisfied whenever a size of the received packet is equal to a packet size limit, the size of the received packet is less than or equal to the packet size limit, the size of the received packet is less than the packet size limit, or the size of the received packet is within a range of the packet size limit.

18 Claims, 5 Drawing Sheets

METHOD AND APPARATUS FOR PRIORITIZING ENCRYPTED TRAFFIC AT AN INTERMEDIATE NODE IN A COMMUNICATIONS NETWORK

FIELD OF THE INVENTION

The present invention relates generally to the field of communications and, more particularly, to a method and apparatus for prioritizing encrypted traffic at an intermediate node in a communications network.

BACKGROUND OF THE INVENTION

The Unlicensed Mobile Access (UMA) specifications recommend security mechanisms for the interfaces between the mobile station (MS) and access point (AP), the MS and unlicensed network controller (UNC), the MS and CS part of the core network (i.e., mobile services switching center (MSC)/visiting location register (VLR)), and the MS and application servers. The Up-interface between the MS and the UNC is secured using IPsec "tunnel mode". In essence, each Internet Protocol (IP) packet sent by the UNC is encrypted by the UNC-SGW and then put into another IP packet. The initial IP packet header is called the "inner" header (and is encrypted) and the generated new IP packet header is called the "outer" header (and is not encrypted). The UMA specifications also recommend that the AP is "transparent" to traffic between the MS and UNC. This means that the AP is not addressed in the application level and the traffic signaling is between the MS and the UNC. As a result, standard, off-the-shelf APs can be used for UMA.

This is also the case in the 3d Generation Partnership Project (3GPP) standards for "Generic Access to A and Gb-interface", otherwise known as a Generic Access Network (GAN). See 3GPP Technical Specifications 43.318 (Stage-2) and 44.318 (Stage 3). Note that the generic access network controller (GANC) in the 3GPP specifications is equivalent to the UNC in the UMA specifications. Similarly, the generic access network controller secure gateway (GANC-SEGW) in the 3GPP specifications is equivalent to the UNC-SGW in the UMA specifications.

These standard APs are not managed and do not have any quality-of-service (QoS) mechanisms to make sure that the end-user experience is good enough when calls are being made over the UMA network. This means that the AP cannot differentiate between different types of traffic (e.g., signaling, voice and GPRS data). Yet the AP is one of the critical points in delivering the needed QoS from the AP to the MS (downlink direction) and the MS to the AP (uplink direction).

The problem lies in the fact that all traffic going through the AP between the MS and the UNC or GANC is encrypted and the only thing visible in the AP is the "outer" IP header. This means that it is impossible to base any prioritization of the packets at the AP on transmission control protocol (TCP) or user datagram protocol (UDP) port numbers, packet types, etc. because all this information is encrypted. The only information that the AP can use to differentiate between different traffic types is contained in the outer IP header, outer UDP header, encapsulated security payload (ESP) header and ESP Auth. Although, the UNC or GANC could mark the DiffServ/TC/ToS bits in the outer IP header and the AP could prioritize different types of traffic based on this information, there is no guarantee that this information will be unmodified when the packets arrive at the AP. The DiffServ, Traffic Class (TC) and Type of Service (ToS) fields are described in The Internet Engineering Task Force publications RFC 2474, RFC 2460 and RFC 791, respectively. Moreover, service providers are not required to use the same node mechanisms or configurations to implement QoS differentiation, so an AP may not recognize or properly decode the DiffServ/TC/ToS bits in the outer IP header. As a result, there is no good way for an AP to prioritize traffic belonging to different traffic types. Accordingly, there is a need for a method and apparatus for prioritizing encrypted traffic at an intermediate node within a communications network.

SUMMARY OF THE INVENTION

The present invention provides a method and apparatus for prioritizing encrypted traffic at an intermediate node within a communications network. More specifically, the present invention prioritizes encrypted packet traffic at an intermediate node based on one or more size-based criteria. The length of the entire packet, which can be read in the unencrypted "outer" header of the packet, is used to identify voice traffic allowing the intermediate node, such as an AP, to give this traffic higher priority. In its simplest embodiment, a specific length is selected and all packets shorter than this length are given higher priority. The present invention, therefore, provides an intermediate node that can prioritize voice traffic while maintaining the "transparent" requirements of the UMA specifications, the "plug and play" capability of APs, and does not depend on the potentially unreliable DiffServ/TC/ToS bits. Moreover, the present invention is able to differentiate between different types of traffic (e.g., signaling, voice and GPRS data). As a result, the present invention provides the QoS mechanisms necessary to make sure that the end-user experience is good enough when calls are being made over an UMA network. Note that this priority processing can be selectively enabled/disabled by the operator or based on traffic conditions, such as high or overloaded situations. As a result, the present invention is efficient, reliable and cost effective.

A more complex embodiment can further prioritize these higher priority packets into two or more higher priorities based on priority indicators (if recognized and properly decoded) within the unencrypted "outer" header of the packet (e.g., DiffServ/TC/ToS bits). The present invention can also dynamically detect the packet size and use this size to prioritize all packets smaller than this size. This would give priority even for the silence descriptor (SID) frames in all different cases. The present invention is applicable to any intermediate node within a network, such as access points, low-speed xDSL modems, L2 devices (switches) and L3 devices (routers).

Accordingly, the present invention provides a method of prioritizing the processing of a packet at an intermediate node within a communications network based on one or more size-based criteria, the packet comprising one or more headers and an encrypted payload. Similarly, the present invention provides an intermediate node within a communications network that prioritizes the processing of a packet based on one or more size-based criteria, the packet comprising one or more headers and an encrypted payload In addition, the present invention provides a method of prioritizing encrypted packets at an intermediate node within a communications network by receiving a packet comprising one or more headers and an encrypted payload and processing the received packet at a higher priority whenever the received packet satisfies one or more size-based criteria. The size of the received packet is determined from one of the headers. The one or more size-based criteria are satisfied whenever a size of the received packet is equal to a packet size limit, the size of the received packet is less than or equal to the packet size limit, the size of the received packet is less than the packet size limit, or the size of the received packet is within a range of the packet size limit. The packet size limit (uplink and/or downlink) is set (fixed, range or dynamic) to process a voice packet at a higher priority than one or more other packet types.

Moreover, the present invention can process the received packet at two or more higher priorities (a first higher priority, a second higher priority, etc.) whenever the received packet satisfies the one or more size-based criteria and one of the headers of the received packet contains a specified priority indicator (e.g., DiffServ/TC/ToS bits). Note that the present invention can be implemented as a computer program embodied on a computer readable medium wherein one or more code segments perform the above described steps.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to communication systems, and more particularly, to access points within an unlicensed mobile access network (UMAN) in accordance with applicable UMA specifications. It will be understood that, although the description herein refers to a communication environment, the concepts of the present invention are applicable to any packet-based environment or any communication system that uses intermediate nodes to process encrypted traffic and it is desirable to prioritize the traffic.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method and apparatus for prioritizing encrypted traffic at an intermediate node within a communications network. More specifically, the present invention prioritizes encrypted packet traffic at an intermediate node based on one or more size-based criteria. The length of the entire packet, which can be read in the unencrypted "outer" header of the packet, is used to identify voice traffic allowing the intermediate node, such as an AP, to give this traffic higher priority. In its simplest embodiment, a specific length is selected and all packets shorter than this length are given higher priority. The present invention, therefore, provides an intermediate node that can prioritize voice traffic while maintaining the "transparent" requirements of the UMA specifications, the "plug and play" capability of APs, and does not depend on the potentially unreliable DiffServ/TC/ToS bits. Moreover, the present invention is able to differentiate between different types of traffic (e.g., signaling, voice and GPRS data). As a result, the present invention provides the quality-of-service (QoS) mechanisms necessary to make sure that the end-user experience is good enough when calls are being made over an UMA network. Note that this priority processing can be selectively enabled/disabled by the operator or based on traffic conditions, such as high or overloaded situations. As a result, the present invention is efficient, reliable and cost effective.

A more complex embodiment can further prioritize these higher priority packets into two or more higher priorities based on priority indicators (if recognized and properly decoded) within the unencrypted "outer" header of the packet (e.g., DiffServ/TC/ToS bits). The present invention can also dynamically detect the packet size and use this size to prioritize all packets smaller than this size. This would give priority even for the silence descriptor (SID) frames in all different cases. The present invention is applicable to any intermediate node within a network, such as access points, low-speed xDSL modems, L2 devices (switches) and L3 devices (routers). Note that the methods and processes described herein can be implemented as a computer program embodied on a computer readable medium wherein one or more code segments perform the requisite steps or processes.

Figure 1:
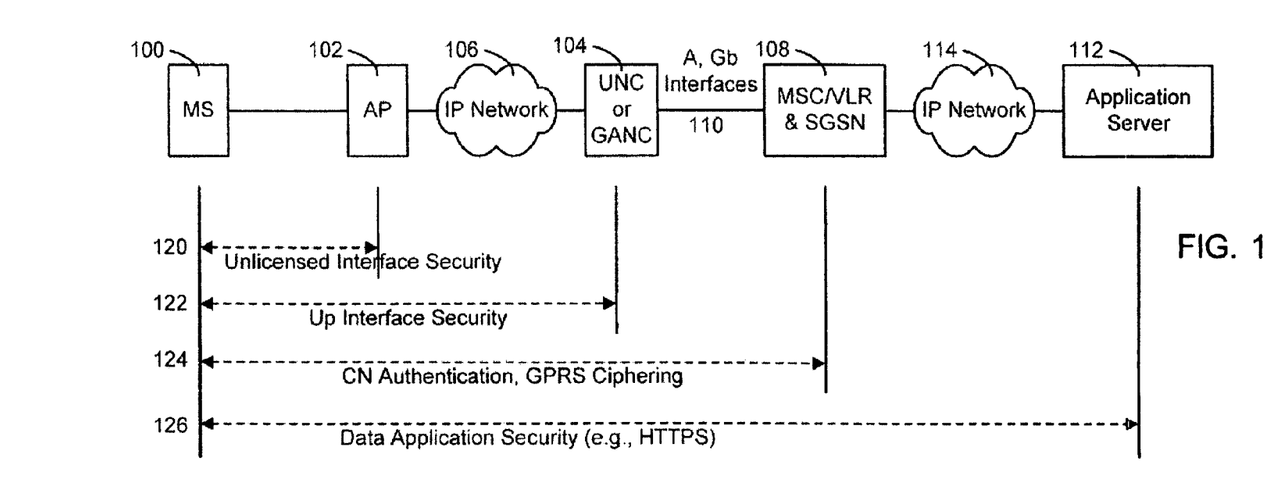
FIG. 1 is a block diagram of a wireless network illustrating the UMA security mechanisms.

Now referring to FIG. 1, a block diagram of a wireless network illustrating the UMA and GAN security mechanisms is shown. In this example, the mobile station (MS) 100 accesses the unlicensed mobile access network (UMAN) or generic access network (GAN) via an access point (AP) 102. The AP 102 is communicably coupled to an unlicensed network controller (UNC) or generic access network controller (GANC) 104 via an internet protocol (IP) network 106. The UNC or GANC 104 is communicably coupled to a mobile services switching center (MSC)/visiting location register (VLR) 108 and to a General Packet Radio Service (GPRS) support node (SGSN) of the core network 108, via A, Gb interfaces 110. The MSC\NLR 108 (on occasion) and SGSN 108 (most often) is communicably coupled to an application server 112 via an IP network 114.

The Unlicensed Mobile Access (UMA) specifications recommend security mechanisms for the interfaces between the MS 100 and AP 102 (interface 120), the MS 100 and UNC or GANC 104 (interface 122), the MS 100 and MSC\NLR 108 and SGSN 108 (interface 124), and the MS 100 and application servers 112 (interface 126). Interface 120 between the MS 100 and the AP 102 is secured using existing mechanisms in the used radio technology (e.g., Bluetooth, WLAN 802.11). The Up-interface 122 between the MS 100 and the UNC or GANC 104 is secured using IPsec "tunnel mode".

Each IP packet sent by the UNC or GANC 104 is encrypted by the UNC or GANC 104 and then put into another IP packet. The initial IP packet header is called the "inner" header (and is encrypted) and the generated new IP packet header is called the "outer" header (and is not encrypted). The interface 124 between the MS 100 and CS part of core network (MSC/VLR 108) uses standard authentication of the MS 100. The interface between the MS 100 and PS part of core network (SGSN) can be ciphered/encrypted using standard GPRS mechanisms. The interface 126 between the MS 100 and application servers 112 can also be secured using standard IP security mechanisms (e.g., HTTPS).

The UMA specifications also recommend that the AP 102 is "transparent" to traffic between the MS 100 and UNC or GANC 104. This means that the AP 102 is not addressed in the application level and the traffic signaling is between the MS 100 and the UNC or GANC 104. The present invention applies to the AP 102 and the Up interface 122 between the MS 100 and the UNC or GANC 104. As described in more detail below, the present invention is able to differentiate between different types of traffic (e.g., signaling, voice and GPRS data). As a result, it provides the QoS mechanisms necessary to make sure that the end-user experience is good enough when calls are being made over an UMA network. Note that the present invention can also be extended to other parts in the network as defined in herein and recognized by those skilled in the art.

Figure 2:
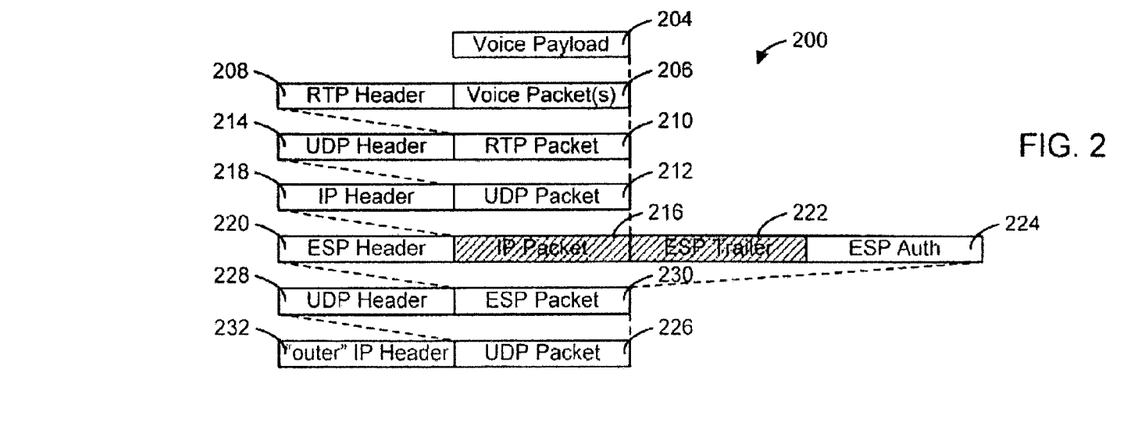
FIG. 2 is a simplified example of a voice packet sent between the MS and UNC or GANC using the standard IPsec mechanisms defined for the Up interface in FIG. 1.

Referring now to FIG. 2, a simplified example of a voice packet 200 sent between the MS 100 and UNC or GANC 104 using the standard IPsec mechanisms recommended for the Up interface 122 in FIG. 1 is shown. One or more voice payloads 204 (e.g., 20 ms of speech) are formatted in accordance with applicable standards, such as RFC 3267 for AMR and AMR-WB codecs, to create voice packet(s) 206 so that it is possible to have multiple voice samples within one IP packet. A RTP header 208 is added to the voice packet(s) 206 to create a RTP packet 210. A UDP packet 212 is then created by adding a UDP header 214 and using the RTP packet 210 as UDP payload. Note that the UDP header 214 is typically only added when the MS 100 and UNC or GANC 104 have identified that there is a Network Address Translator (NAT) between them. The next step is that an IP packet 216 is created by adding an IP header 218. The UDP packet 212 is used as the IP payload. Now the IP packet 216 is ready and if no IPsec was used this packet could be sent out from the UNC or GANC 104.

When IPsec is used, an ESP header 220, ESP Trailer 222 and ESP Auth field 224 are wrapped around the IP packet 216. The Inner IP packet 216 and the ESP trailer 222 are then encrypted (illustrated in FIG. 2 by the shading). A UDP packet 226 is then created by adding a UDP header 228 to the ESP packet 230. The ESP packet 230 is the UDP payload. Finally the UDP packet 226 gets an IP header 232 (the outer IP header) to create the voice packet 200. When the voice packet 200 is sent from the UNC or GANC 104 to the MS 100, only the outer IP header 232, outer UDP header 228, ESP header 220 and ESP Auth 224 are readable and these headers are the only information that can be used to differentiate between different traffic types. Note that the outer IP header 232 includes a field that can be used to differentiate service (e.g., DiffServ/TC/ToS field). The DiffServ, Traffic Class (TC) and Type of Service (ToS) fields are described in The Internet Engineering Task Force publications RFC 2474, RFC 2460 and RFC 791, respectively. The UNC or GANC 104 can mark the DiffServ/TC/ToS bits so that the AP 102 can prioritize different types of traffic based on this information. As previously described, the use of this field does not provide true "plug and play" capability and does not guarantee that this information is accurate or unmodified when the IP packets arrive at the AP 102.

Figure 3:
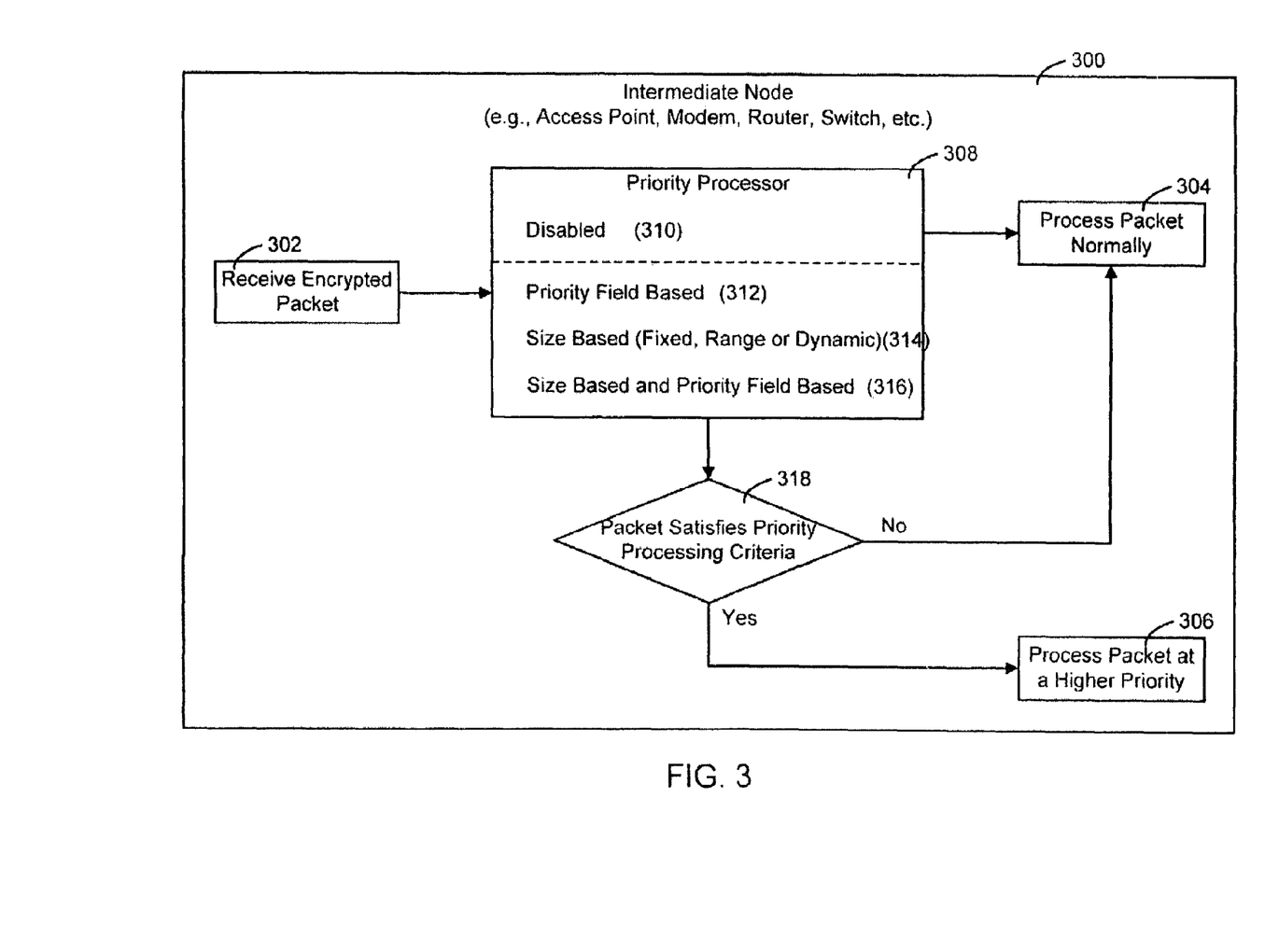
FIG. 3 is a block diagram of an intermediate node in accordance with one embodiment of the present invention.

Now referring to FIG. 3, a block diagram of an intermediate node 300 in accordance with one embodiment of the present invention is shown. The intermediate node prioritizes the processing of a packet based on one or more size-based criteria. The intermediate node 300 can be an access point, a modem, a router, a switch or other similar device. The intermediate node 300 receives the packet 302, which includes one or more headers and an encrypted payload (e.g., voice packet 200), and either processes the packet normally 304 or at one or more higher priorities 306 using a priority processor 308 (e.g., filter, pre-processor, buffers, queues, etc.). The priority processor 308 can operate in the downlink, the uplink or both the downlink and uplink. As shown, the priority processor 308 can be configured to various operating modes, which can be enabled/disabled by the operator or by various operating criteria, such as traffic loading. The operating modes include priority-field-based criteria 312, size-based criteria 314, and size-based/priority-field-based criteria 316. The size-based priority 314 and 316 processing can be further selected to be based on a fixed value, a range or a dynamic value. Note that the intermediate node 300 can be implemented to only use one of the operating modes, such as size-based processing 314. When the priority processor 308 is disabled 310, all the received packets 302 will be processed normally 304. When the priority processor 308 is enabled, the received packet 302 is processed normally 304 if the packet does not satisfy the applicable priority processing criteria, as illustrated by decision block 318. If, however, the received packet 302 does satisfy the applicable priority processing criteria, as illustrated by decision block 318, the packet is processed at one or more higher priorities 306.

Figure 4:
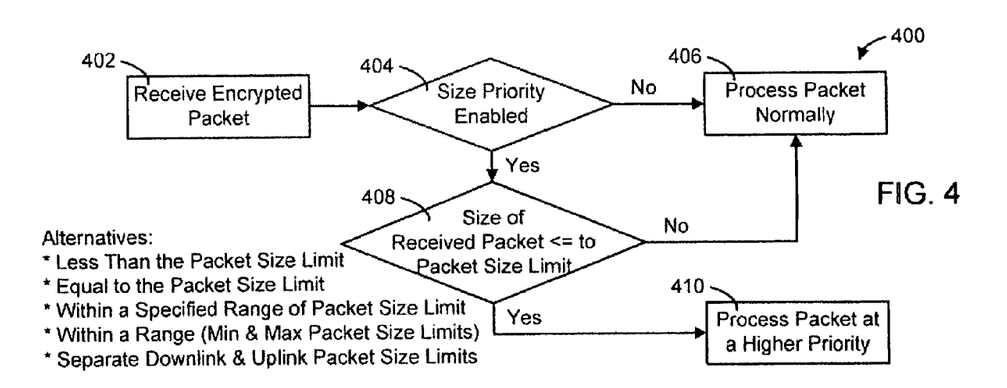
FIG. 4 is a flow chart illustrating a method of prioritizing traffic in accordance with one embodiment of the present invention.
Figure 5:
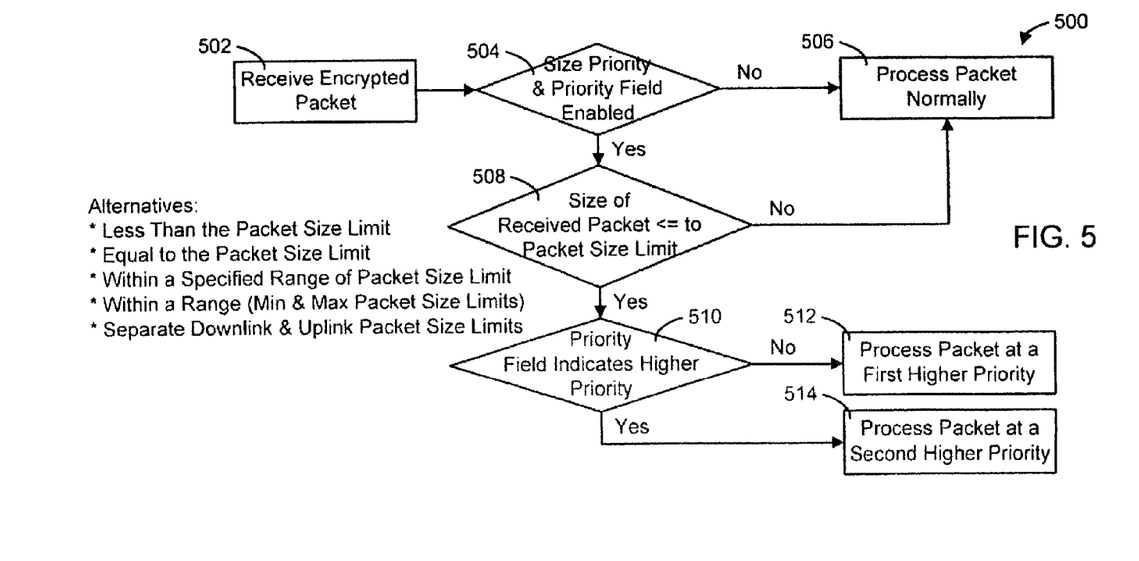
FIG. 5 is a flow chart illustrating a method of prioritizing traffic in accordance with another embodiment of the present invention.
Figure 6:
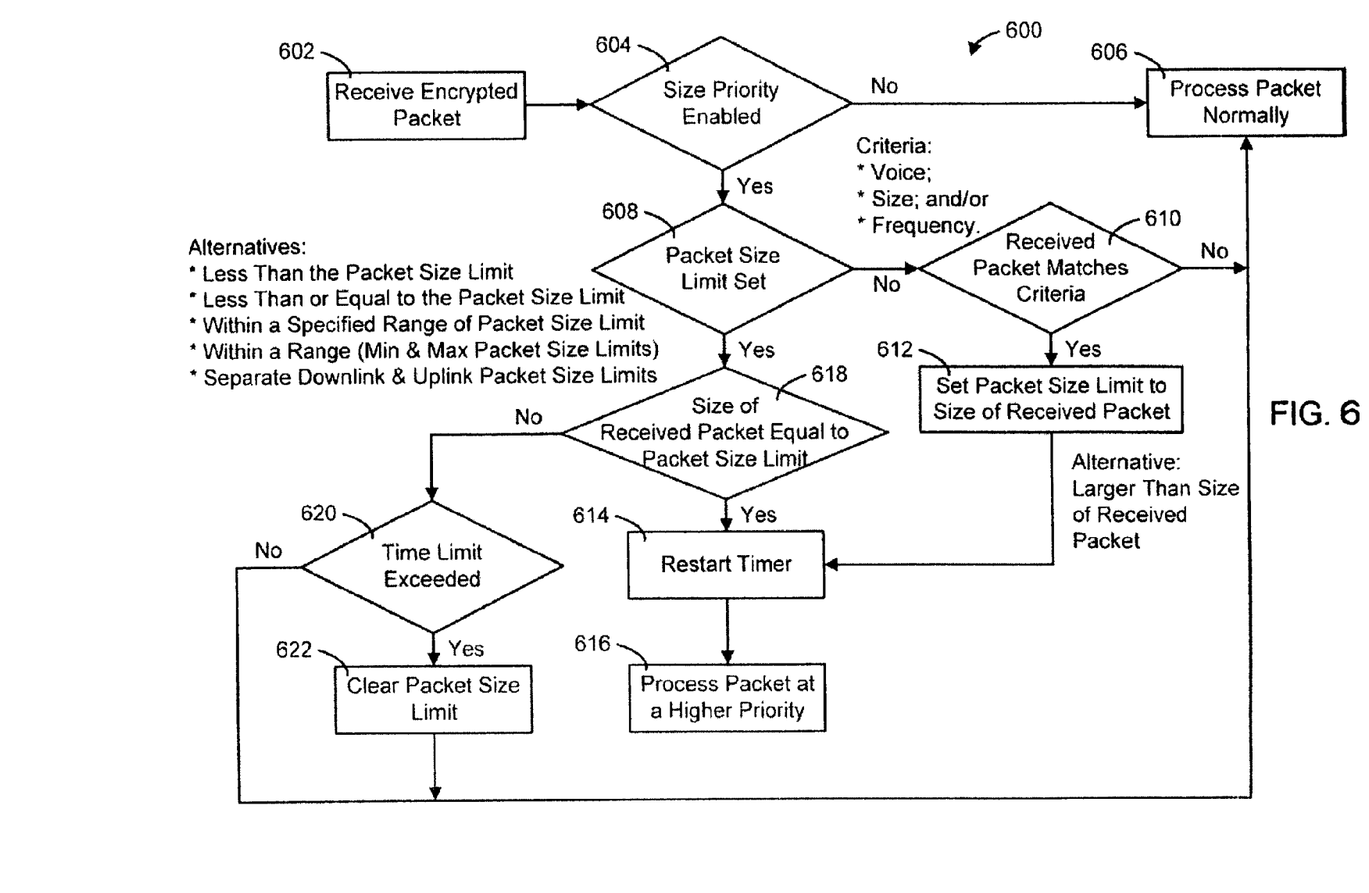
FIG. 6 is a flow chart illustrating a method of dynamically prioritizing traffic in accordance with one embodiment of the present invention.

The priority-field-based priority 312 processing relies on the DiffServ/TC/ToS field in the outer header; whereas, the size-based priority 314 processing relies on the size field in the outer header as described in more detail in reference to FIGS. 4 and 6. The size-based/priority-field-based priority 316 processing uses both the DiffServ/TC/ToS field and the size field in the outer header. For example, sized-based/priority-field-based priority 316 processing can process the packet based on the highest priority indicated by the priority field and the size field, or use the priority field as a primary priority indicator and the size field as a secondary priority indicator, or use the size field as a primary priority indicator and the priority field as a secondary indicator as described in more detail in reference to FIGS. 5 and 7.

The selection of a fixed value for use in the size-based priority 314 and 316 processing will now be described. This fixed value is described herein as a packet size limit. The packet size limit can be specified using a range (minimum packet size limit, maximum packet size limit), or a direction (uplink, downlink). Voice packets will have a size of approximately 33 bytes per 20 ms. The voice sample size can be a whole multiple of 20 ms. 20 ms or 40 ms voice samples are the most realistic scenario, but even 60 ms and 80 ms are allowed in the UMA specifications. This implies that a voice packet size will be up to 129 bytes plus headers (80 ms voice per IP packet).

GPRS payload is LLC PDU's. The size of the LLC PDU's can be up to N201, according to 3GPP TS 44.064. N201 can be negotiated between MS and SGSN min value is 140 and max is 1520. This implies that the min size (N201=140) of a full GPRS packet is (minimum header sizes applied):

| URLC packet | |
|---|---|
| LLC address | 1 |
| LLC control field | 2 |
| LLC Payload (N201 min) | 140 |
| LLC PCS | 3 |
| URLC Message id | 1 |
| URLC TLLI | 4 |
| URLC Sequence no | 2 |
| URLC QoS (conditional & uplink only) | 5 |
| URLC Packet flow (optional) | 0 |
| Total URLC Packet | 158 |
| Header sizes | |
| IP header | 20 |
| UDP header | 8 |
| ESP header | 8 |
| IP header | 20 |
| UDP header | 8 |
| RTP header | 12 |
| Ipsec Initialization Vector | 16 |
| ESP Padding | 8 |
| ESP Pad length Next Header | 2 |
| ESP auth | 12 |
| Total IP headers | 114 |
| Total Size | |
| URLC Packet | 158 |
| IP Headers | 114 |
| Total Size | 272 |

The total minimum size of a full GPRS packet on IP layer when passing the intermediate node 300 is then 272 bytes.

A voice packet with 4 voice packets will have the following size:

| Voice size | |
|---|---|
| Voice sample size in bytes | 30.5 |
| Voice samples per Voice packet | 4 |
| AMR type | AMR 12.2 |
| AMR voice sample size | 30.5 |
| Voice packet size incl header (RFC 3267) | 129 |
| Header sizes | |
| IP header | 20 |
| UDP header | 8 |
| ESP header | 8 |
| IP header | 20 |
| UDP header | 8 |
| RTP header | 12 |
| Ipsec Initialization Vector | 16 |
| ESP Padding | 5 |
| ESP Pad length Next Header | 2 |
| ESP auth | 12 |
| Total IP headers | 111 |
| Total size | |
| Voice packet size incl header (RFC 3267) | 129 |
| Total IP headers | 111 |
| Total Size | 240 |

The maximum length of a voice packet at IP layer when passing the intermediate node 300 is then 240 bytes. This implies that a full GPRS with N201 at its minimum value will be larger than the largest voice packet. This further implies that voice packets will be smaller than most GPRS packets.

The N201 value is negotiated between the MS and the SGSN and the UNC or GANC is not aware of this value. The intermediate node 300 should, therefore, process all received packets having a size less than 140 bytes plus all headers (e.g., 272 bytes) at a higher priority when size-based priority 314 or 316 processing is enabled. Alternatively, the intermediate node 300 can process all received packets having a size less than or equal to 240 bytes at a higher priority when size-based priority 314 or 316 processing is enabled (packet size limit=240). Note that at these values, all voice packets should be processed at a higher priority, and some signaling and data packets will likely be processed at a higher priority as well. This is an acceptable result in most circumstances.

Accordingly, the present invention provides a method of prioritizing encrypted packets at an intermediate node within a communications network by receiving a packet comprising one or more headers and an encrypted payload, and processing the received packet at a higher priority whenever the received packet satisfies one or more size-based criteria. The one or more size-based criteria are satisfied whenever a size of the received packet is equal to a packet size limit, the size of the received packet is less than or equal to the packet size limit, the size of the received packet is less than the packet size limit, or the size of the received packet is within a range of the packet size limit. The packet size limit (uplink and/or downlink) is set (fixed, range or dynamic) to process a voice packet at a higher priority than one or more other packet types.

Referring now to FIG. 4, a flow chart illustrating a method 400 of prioritizing traffic in accordance with one embodiment of the present invention is shown. A packet having one or more headers and an encrypted payload is received in block 402. The received packet is processed at a normal priority in block 406 whenever size-based priority processing is disabled, as determined in decision block 404. If, however, size-based priority processing is enabled, as determined in decision block 404, and the size of the received packet is not less than or equal to the packet size limit, as determined in decision block 408, the received packet is processed normally in block 406. If, however, the size of the received packet is less than or equal to a packet size limit (e.g., 240 bytes), as determined in decision block 408, the received packet is processed at a higher priority in block 410. Note that the size-based criteria can be any comparison of the size of the received packet to one or more packet size limits (e.g., less than the packet size limit, equal to the packet size limit, within a range of the packet size limit, between a minimum packet size limit and a maximum packet size limit, etc.).

Now referring to FIG. 5, a flow chart illustrating a method 500 of prioritizing traffic in accordance with another embodiment of the present invention is shown. A packet having one or more headers and an encrypted payload is received in block 502. The received packet is processed at a normal priority in block 506 whenever size priority and priority field processing is disabled, as determined in decision block 504. If, however, size priority and priority field processing is enabled, as determined in decision block 504, and the size of the received packet is not less than or equal to the packet size limit, as determined in decision block 508, the received packet is processed normally in block 506. If, however, the size of the received packet is less than or equal to a packet size limit (e.g., 240 bytes), as determined in decision block 508, and the priority field in the header does not indicate a higher priority than a standard voice packet, as determined in decision block 510, the received packet is processed at a first higher priority in block 512. If, however, the priority field in the header indicates a higher priority than a standard voice packet, as determined in decision block 510, the received packet is processed at a second higher priority in block 514. This embodiment allows specified users or service providers to be accorded a higher priority (premium service) than normal voice traffic. Note that more than two higher priorities can be used. The priority field can also be used to lower the priority of a received packet that satisfies the sized-based criteria if the priority field indicates that the received packet is a signaling or data packet. In addition, the size-based criteria can be any comparison of the size of the received packet to one or more packet size limits (e.g., less than the packet size limit, equal to the packet size limit, within a range of the packet size limit, between a minimum packet size limit and a maximum packet size limit, etc.).

Referring now to FIG. 6, a flow chart illustrating a method 600 of dynamically prioritizing traffic in accordance with one embodiment of the present invention is shown. In this embodiment, no packet size limit is initially set. The intermediate node is able to identify, which exact packets sizes are voice and give priority to these packets. Silence frames sent are normally either of the same size as voice or have a fixed (and smaller) size, so these can be also identified. A packet having one or more headers and an encrypted payload is received in block 602. The received packet is processed at a normal priority in block 606 whenever size-based priority processing is disabled, as determined in decision block 604. If, however, size-based priority processing is enabled, as determined in decision block 604, and a packet size limit has not been set, as determined in decision block 608, and the received packet does not satisfy one or more criteria, as determined in decision block 610, the received packet is processed at a normal priority in block 606. If, however, the received packet does satisfy one or more criteria, as determined in decision block 610, the packet size limit is set to the size of the received packet in block 612, a timer is restarted in block 614 and the received packet is processed at a higher priority in block 616. Alternatively, the packet size limit can be set to a size larger than the size of the received packet.

The one or more criteria are used to ensure that the received packet is a voice packet. In other words, the intermediate node detects that one packet size is transmitted frequently inside the IPsec tunnel. This packet size has to be one of the allowed packet sizes used for voice. For example, when the intermediate node detects that 10 packets with the same size were transmitted for approximately each 20 ms, it can start prioritizing the packets of this size as it has identified that these packets belong to a voice call. A counter and timer can be used to determine the "frequency" of these packets. This prioritization can be applied for both directions, but it can also be done independently in the uplink and downlink directions. This means that the intermediate node needs to identify the voice packets independently in each direction.

If, however, the packet size limit is set, as determined in decision block 608, and the size of the received packet is equal to a packet size limit, as determined in decision block 618, a timer is restarted in block 614 and the received packet is processed at a higher priority in block 616. If, however, the size of the received packet is not equal to the packet size limit, as determined in decision block 618, and the time limit has not been exceeded, as determined in decision block 620, the received packet is processed normally in block 606. If, however, the time limit has been exceeded, as determined in decision block 620, the packet size limit is cleared in block 622 and the received packet is processed normally in block 606. The timer used in block 614 and decision block 620 is used to detect when the call is disconnected, i.e. if the packets of the detected size are not transmitted anymore then the intermediate node can stop prioritization. This timer is optional and could be for example 30 seconds.

Note that silence descriptor (SID) frames are normally sent, if Voice Activity Detection/Discontinuous Transmission (VAD/DTX) is enabled for a call and silence is detected. These frames are sent (e.g., each 480 ms) as long as there is silence. The size of these packets varies depending on the voice codec used (for some codecs the size is the same as for a voice packet and for some voice codecs these packets are smaller). There is really no need to priority for these packets. The size-based criteria can be set so that the packet size is detected dynamically and then this size is used to prioritize all packets smaller than this size. This gives priority even for the SID-frames in all different cases. Accordingly, the size-based criteria can be any comparison of the size of the received packet to one or more packet size limits (e.g., less than the packet size limit, equal to the packet size limit, within a range of the packet size limit, between a minimum packet size limit and a maximum packet size limit, etc.).

Figure 7:
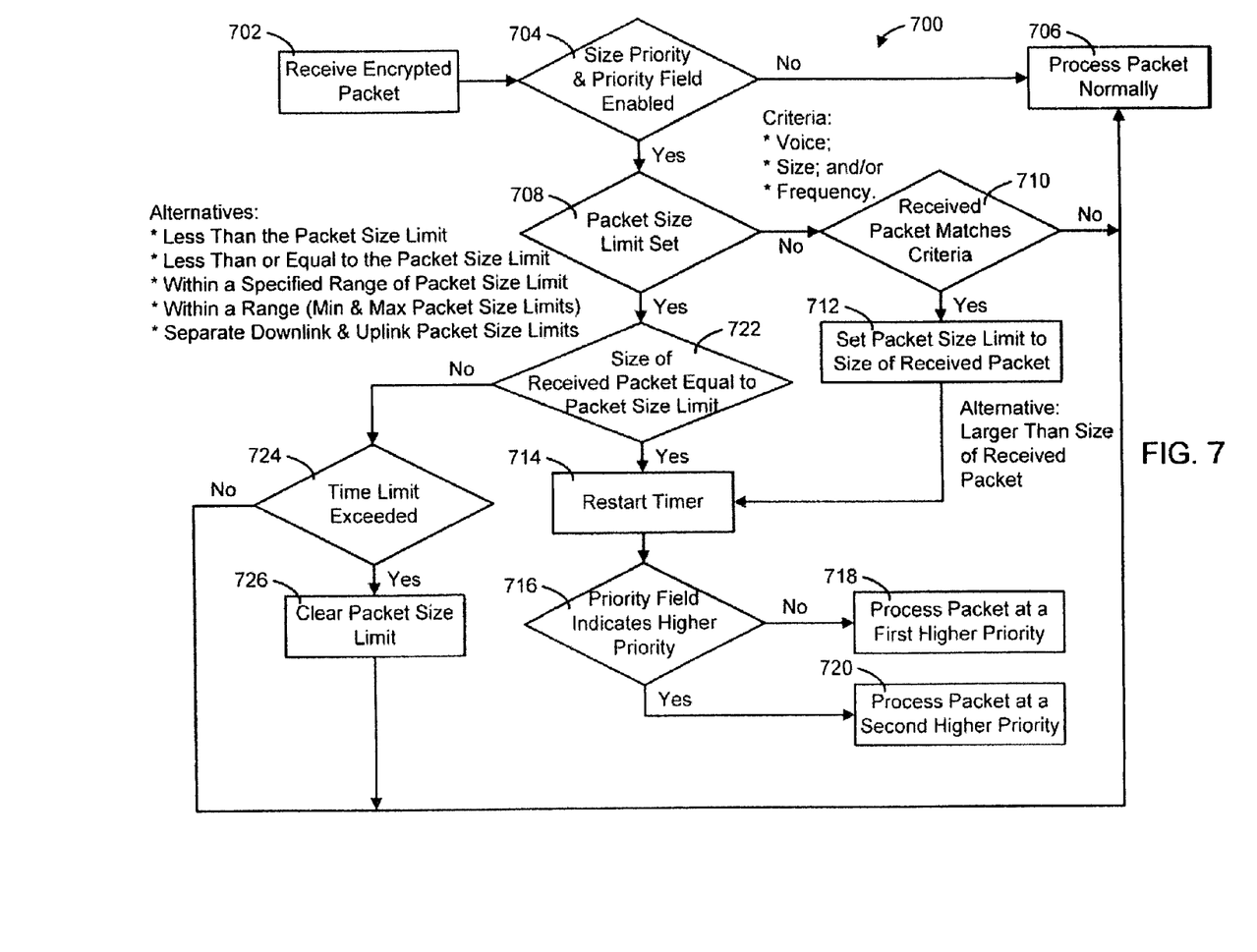
FIG. 7 is a flow chart illustrating a method of dynamically prioritizing traffic in accordance with another embodiment of the present invention.

Now referring to FIG. 7, a flow chart illustrating a method 700 of dynamically prioritizing traffic in accordance with another embodiment of the present invention is shown. In this embodiment, no packet size limit is initially set. The intermediate node is able to identify, which exact packets sizes are voice and give priority to these packets. A packet having one or more headers and an encrypted payload is received in block 702. The received packet is processed at a normal priority in block 706 whenever size priority and priority field processing is disabled, as determined in decision block 704. If, however, size priority and priority field processing is enabled, as determined in decision block 704, and a packet size limit has not been set, as determined in decision block 708, and the received packet does not satisfy one or more criteria, as determined in decision block 710, the received packet is processed at a normal priority in block 706. If, however, the received packet does satisfy one or more criteria, as determined in decision block 710, the packet size limit is set to the size of the received packet in block 712, and a timer is restarted in block 714. If the priority field in the header does not indicate a higher priority than a standard voice packet, as determined in decision block 716, the received packet is processed at a first higher priority in block 718. If, however, the priority field in the header indicates a higher priority than a standard voice packet, as determined in decision block 716, the received packet is processed at a second higher priority in block 720. This embodiment allows specified users or service providers to be accorded a higher priority (premium service) than normal voice traffic. Note that more than two higher priorities can be used. The priority field can also be used to lower the priority of a received packet that satisfies the sized-based criteria if the priority field indicates that the received packet is a signaling or data packet. Alternatively, the packet size limit can be set to a size larger than the size of the received packet.

The one or more criteria are used to ensure that the received packet is a voice packet. In other words, the intermediate node detects that one packet size is transmitted frequently inside the IPsec tunnel. This packet size has to be one of the allowed packet sizes used for voice. For example, when the intermediate node detects that 10 packets with the same size were transmitted for approximately each 20 ms, it can start prioritizing the packets of this size as it has identified that these packets belong to a voice call. A counter and timer can be used to determine the "frequency" of these packets. This prioritization can be applied for both directions, but it can also be done independently in the uplink and downlink directions.

This means that the intermediate node needs to identify the voice packets independently in each direction.

If, however, the packet size limit is set, as determined in decision block 708, and the size of the received packet is equal to a packet size limit, as determined in decision block 722, a timer is restarted in block 714. If the priority field in the header does not indicate a higher priority than a standard voice packet, as determined in decision block 716, the received packet is processed at a first higher priority in block 718. If, however, the priority field in the header indicates a higher priority than a standard voice packet, as determined in decision block 716, the received packet is processed at a second higher priority in block 720. If, however, the size of the received packet is not equal to the packet size limit, as determined in decision block 722, and the time limit has not been exceeded, as determined in decision block 724, the received packet is processed normally in block 706. If, however, the time limit has been exceeded, as determined in decision block 724, the packet size limit is cleared in block 726 and the received packet is processed normally in block 706. The timer used in block 714 and decision block 724 is used to detect when the call is disconnected, i.e. if the packets of the detected size are not transmitted anymore then the intermediate node can stop prioritization. This timer is optional and could be for example 30 seconds.

The size-based criteria can be set so that the packet size is detected dynamically and then this size is used to prioritize all packets smaller than this size. This would give priority even for the SID-frames in all different cases. Accordingly, the size-based criteria can be any comparison of the size of the received packet to one or more packet size limits (e.g., less than the packet size limit, equal to the packet size limit, within a range of the packet size limit, between a minimum packet size limit and a maximum packet size limit, etc.).

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method of prioritizing encrypted packets at an intermediate node within a communications network, said method comprising the steps of:
   receiving a packet comprising one or more headers and an encrypted payload;
   determining a value for a packet size limit by setting the packet size limit to a size of the received packet whenever the size of the received packet corresponds to a voice packet and a predetermined number of packets have been received within a first time period, wherein the packet size limit comprises a fixed value or a dynamic value; and
   processing the received packet at a higher priority whenever the received packet satisfies one or more size-based criteria;
   wherein the received packet satisfies the one or more size-based criteria whenever a size of the received packet is equal to the packet size limit, the size of the received packet is less than or equal to the packet size limit, or the size of the received packet is less than the packet size limit.

2. The method as recited in claim 1, wherein the intermediate node is selected from a group consisting of an access point, a modem, a router, or a switch.

3. The method as recited in claim 1, further comprising the step of determining the size of the received packet from one of the headers.

4. The method as recited in claim 1, wherein the packet size limit comprises a downlink packet size limit and an uplink packet size limit.

5. The method as recited in claim 1, wherein the packet size limit is set to process a voice packet at a higher priority than one or more other packet types.

6. The method as recited in claim 1, wherein the packet size limit is less than 272 bytes.

7. The method as recited in claim 1, wherein the packet size limit comprises a minimum packet size limit and a maximum size limit.

8. The method as recited in claim 1, further comprising the step of clearing the packet size limit whenever no voice packets have been received within a second time period.

9. The method as recited in claim 1, further comprising the step of processing the packet at a second higher priority whenever the received packet satisfies the one or more size-based criteria and one of the headers of the received packet contains a specified priority indicator.

10. An intermediate node within a communications network, said intermediate node prioritizing the processing of a packet based on one or more size-based criteria, the packet comprising one or more headers and an encrypted payload, said intermediate node comprising:
    means for receiving a packet comprising one or more headers and an encrypted payload; and
    a processor in communication with the receiving means, said processor comprising:
    means for determining a value for a packet size limit by setting the packet size limit to a size of the received packet whenever the size of the received packet corresponds to a voice packet and a predetermined number of packets have been received within a first time period, wherein the packet size limit comprises a fixed value or a dynamic value; and
    means for processing the received packet at a higher priority whenever the received packet satisfies one or more size-based criteria, wherein the received packet satisfies the one or more size-based criteria whenever a size of the received packet is equal to the packet size limit, the size of the received packet is less than or equal to the packet size limit, or the size of the received packet is less than the packet size limit.

11. The intermediate node as recited in claim 10, wherein the intermediate node is selected from a group consisting of an access point, a modem, a router, and a switch.

12. The intermediate node as recited in claim 10, further comprising means for determining the size of the received packet from one of the headers.

13. The intermediate node as recited in claim 10, wherein the means for determining a value for a packet size limit includes means for determining a value for a downlink packet size limit and an uplink packet size limit.

14. The intermediate node as recited in claim 10, wherein the means for processing the received packet processes a voice packet at a higher priority than one or more other packet types.

15. The intermediate node as recited in claim 10, wherein the packet size limit is less than 272 bytes.

16. The intermediate node as recited in claim 10, wherein the packet size limit comprises a minimum packet size limit and a maximum size limit.

17. The intermediate node as recited in claim 10, further comprising means for clearing the packet size limit whenever no voice packets have been received within a second time period.

18. The intermediate node as recited in claim 10, wherein the means for processing the received packet includes means for processing the packet at a second higher priority whenever the received packet satisfies the one or more size-based criteria and one of the headers of the received packet contains a specified priority indicator.

* * * * *

UNITED STATES PATENT AND TRADEMARK OFFICE
CERTIFICATE OF CORRECTION

PATENT NO. : 7,506,156 B2
APPLICATION NO. : 11/047881
DATED : March 17, 2009
INVENTOR(S) : Christensen et al.

It is certified that error appears in the above-identified patent and that said Letters Patent is hereby corrected as shown below:

In Column 4, Line 55, delete "MSCNLR" and insert -- MSC/VLR --, therefor.

In Column 4, Line 61, delete "MSCNLR" and insert -- MSC/VLR --, therefor.

In Column 7, Line 8, in Table, delete "PCS" and insert -- FCS --, therefor.

Signed and Sealed this

Twenty-sixth Day of May, 2009

JOHN DOLL
*Acting Director of the United States Patent and Trademark Office*